(No Model.)
W. J. WALKER.
CAR COUPLING.
No. 430,202. Patented June 17, 1890.
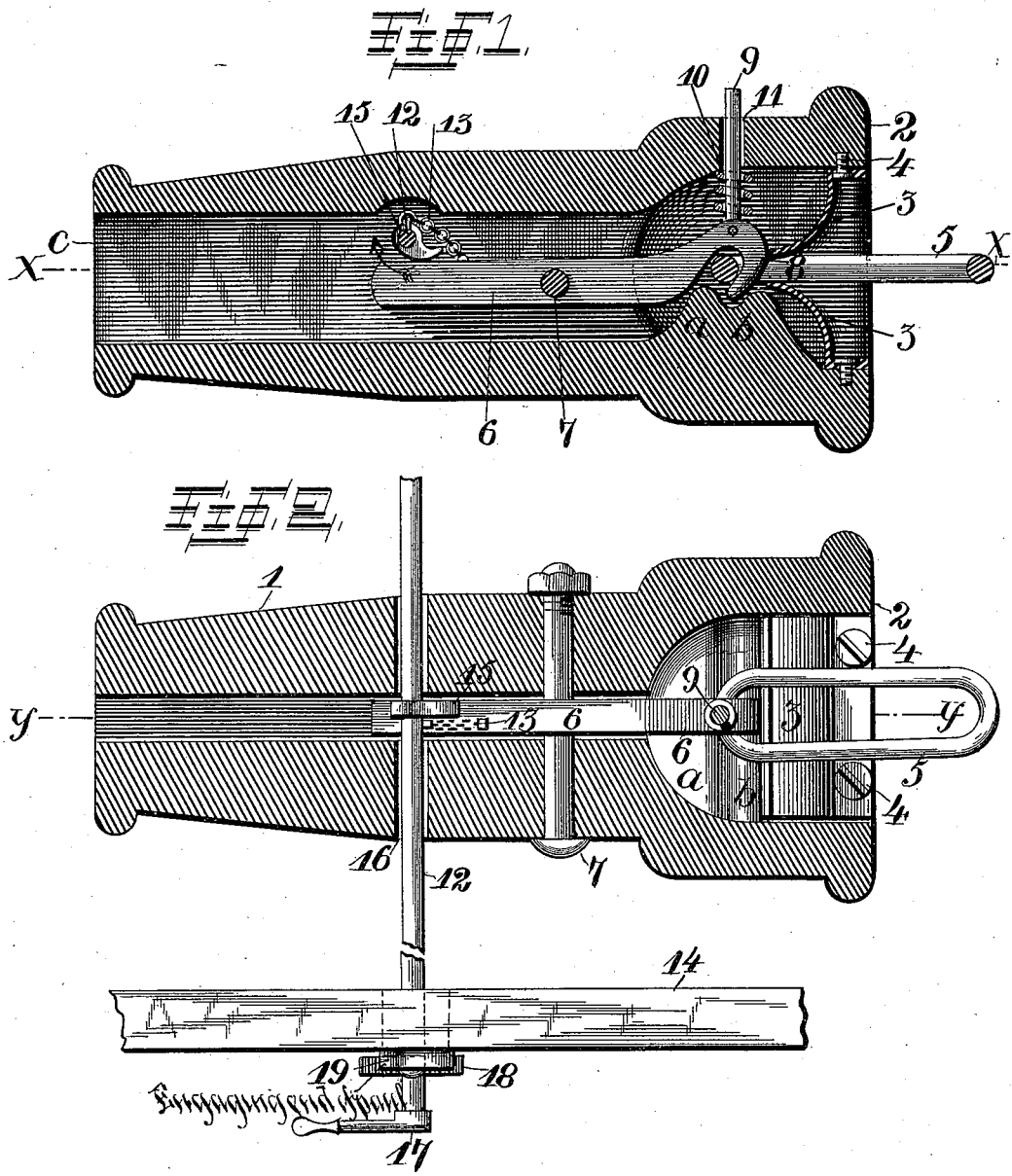
Witnesses
Inventor
William J. Walker.
By his Attorneys
Higdon & Higdon

UNITED STATES PATENT OFFICE.

WILLIAM J. WALKER, OF ST. LOUIS, MISSOURI.

CAR-COUPLING.

SPECIFICATION forming part of Letters Patent No. 430,202, dated June 17, 1890.

Application filed April 17, 1890. Serial No. 348,424. (No model.)

*To all whom it may concern:*

Be it known that I, WILLIAM J. WALKER, of the city of St. Louis, in the State of Missouri, have invented certain new and useful Improvements in Car-Couplings, of which the following is a full, clear, and exact description, reference being had to the accompanying drawings, forming a part hereof.

This invention relates to that class of couplings known as "hook and link;" and it consists in certain improvements upon the coupling shown and described in my pending application, filed March 25, 1890, Serial No. 345,240, all as will be hereinafter fully set forth, and pointed out in the claims.

In the drawings, Figure 1 is a longitudinal section of my invention, taken on line $y\ y$ of Fig. 2; and Fig. 2 is a sectional plan view of same, taken on line $x\ x$, Fig. 1.

1 represents the draw-bar, having the usual head 2 and longitudinal passage $c$ to receive the working parts of the coupling, and also cast with an upward swell $a$, having a transverse depression or channel $b$ in its apex, and said swell being located near the forward entrance to said passage.

3 3 are two springy or flexible jaws oppositely located in the forward entrance and secured at their outer ends to the upper and lower walls of the passage $c$ by means of suitable screws, rivets, or other fastenings 4, in order that their free inner ends may converge at or near the center of said passage $c$ of the draw-bar, between which the link 5 in operation passes or is held thereby loosely.

6 represents a hook-lever fulcrumed at 7 within said passage $c$ and provided with a hook 8 at its forward end and said hook having an inclined forward face. To the upper surface of the hook 8 is pivoted a vertical rod 9, carrying a coiled spring 10, which spring is interposed between said hook and the upper wall of the passage $c$, whereby said hook is urged downward at all times with its point projecting into the depression $b$, thus taking considerable of the strain of draft off of said hook and imposing it upon said swell $a$. The rod 9 passes upward through an aperture 11 in the head of the draw-bar, which holds said rod in a vertical position. In some cases the rod and spring just described may be dispensed with provided the hook-lever is weighted at its forward end, so as to always rest in contact with the swell in the draw-bar except during the act of raising the said hook.

To operate said hook in coupling and uncoupling and locking same in a coupled position, I provide a transverse shaft 12, which extends across the draft-timber 14 and through a transverse passage 16 in the draw-bar, and a cam 15 is mounted on this shaft in the longitudinal passage $c$, so as to engage the rear free end of said hook-lever to depress same in uncoupling when said shaft is rocked in the direction of the arrow in Fig. 1. When said shaft is rocked in an opposite direction, a short chain 13 pulls the free end of the hook-lever upward, and thereby locks and holds it in a locked position. One end of said chain is fastened to the shaft 12, so as to wind therearound, and the other end is secured to the free end of the hook-lever. On one end of the shaft 12 a suitable hand lever or crank 17, also a ratchet-wheel 18, are mounted, and a pawl 19 is pivoted to one of the timbers—such as 14—so as to engage and lock said ratchet-wheel and shaft against movement in direction of the arrow.

The operation is as follows: In coupling, the link 5 is to be inserted between the flexible jaws 3 3, and as the inward movement continues said link engages the inclined face of the hook, causing said hook to rise and permit the link to pass, after which the hook drops and engages the link in the well-known manner.

In uncoupling, the pawl 19 is raised and the cam is brought in contact with the free rear end of the hook-lever, causing same to free its hooked end from the link and permitting the latter to be withdrawn.

What I claim is—

1. A car-coupling having a hook-lever 6 pivoted therein, in combination with a transverse shaft 12, provided with a cam 15 and a chain 13, said cam adapted to depress said hook-lever at its inner end when said shaft is rocked in one direction, and said chain adapted to raise said hook-lever at said end when the shaft is rocked in an opposite direction, substantially as described.

2. A car-coupling having a hook-lever fulcrumed therein, in combination with a transverse shaft provided with a cam and a chain, said cam adapted to depress said hook-lever at its inner end when said shaft is rocked in one direction, and said chain raising said hook-lever at said end when the shaft is rocked in an opposite direction, a hand crank or lever 17, and a ratchet-wheel 18, mounted on said shaft, and a pawl 19, for engaging said ratchet-wheel, substantially as described.

3. A car-coupling having a rigid bottom and top, and having a hook-lever pivoted therein, a swell arising from the said rigid bottom, having a transversely-extending depression therein, and oppositely-located spring-link guides, one arising from the bottom and the other depending from the top of the said coupling, as described.

In testimony whereof I affix my signature in presence of two witnesses.

WILLIAM J. WALKER.

Witnesses:
C. F. KELLER,
JNO. C. HIGDON.